United States Patent

[11] 3,547,470

[72] Inventor William R. Parkhurst
 Sedalia, Mo.
[21] Appl. No. 866,267
[22] Filed Oct. 14, 1969
 Continuation-in-part of Ser. No. 783,286,
 Dec. 12, 1968, Patent No. 3,481,630
[45] Patented Dec. 15, 1970
[73] Assignee Parkhurst Manufacturing Co., Inc.
 Sedalia, Mo.
 a corporation of Missouri

[54] TRAILER HITCH ASSEMBLY
 8 Claims, 3 Drawing Figs.
[52] U.S. Cl. .................................................... 280/502
[51] Int. Cl. .................................................... B60d 1/14
[50] Field of Search .......................................... 280/502, 495

[56] References Cited
 UNITED STATES PATENTS
3,113,789 12/1963 Safford ......................... 280/502

Primary Examiner—Banjamin Hersh
Assistant Examiner—Robert R. Song
Attorney—Schmidt, Johnson, Hovey, Williams & Chase ABSTRACT: A trailer hitch assembly for coupling a towed vehicle to attachable structure in the nature of the bumper and frame bracket of a towing vehicle, the trailer hitch assembly including a drawbar having a pair of spaced-apart hitch units carried thereby, the hitch units each including a mount which engages the bumper of the towing vehicle, there being mechanism for attaching the mount to the structure and takeup means carried by a sleeve which is a part of the mount, the takeup means including a threaded portion and a wedge plate portion whereby, when the takeup means is actuated, an inclined edge of the wedge plate portion moves into engagement with the drawbar to retain the drawbar with respect to the mount and thereby securely attach the hitch to the towing vehicle. Also, a cover plate assembly is provided which has a pin depending therefrom, the pin being selectively engageable with one of a plurality of holes formed in the drawbar whereby to prevent longitudinal shifting movement of the hitch unit with respect to the drawbar, the cover plate assembly being engaged by the takeup means whereby, when the takeup means is actuated, the pin is retained in said hole.

PATENTED DEC 15 1970

3,547,470

INVENTOR.
William R. Parkhurst
BY
Schmidt, Johnson, Hovey,
Williams & Chase.
ATTORNEYS.

TRAILER HITCH ASSEMBLY

CROSS REFERENCES

This application is a continuation-in-part of application Ser. No. 783,286, filed Dec. 12, 1968, and entitled "Trailer Hitch Assembly," now U.S. Pat. No. 3,481,630, dated Dec. 12, 1969.

It is the primary object of this invention to provide a trailer hitch assembly which is adaptable for use on virtually any vehicle regardless of the configuration of the bumper thereof.

It is a most important object of this invention to provide a tailer hitch assembly wherein the drawbar, which forms a part thereof, is tightly retained with respect to the structure of the towing vehicle, this being accomplished by a pair of hitch units which are carried by the drawbar and attachable to such structure, there being a mount as a part of each hitch unit, the mount having take up means for one of the mechanisms which attaches the mount to the structure, the take up means including a wedge plate portion having a bight and a pair of legs, the wedge plate portion being shiftable with respect to the drawbar whereby to bring an inclined edge formed on each of said legs into progressively tighter engagement with the drawbar as the take up means is actuated.

It is yet another important aim t this invention to provide a trailer hitch assembly wherein the the hitch units, which are carried by the drawbar, are retained against longitudinal shifting movement along the drawbar, such retention being accomplished by retaining means in the form of a cover plate assembly, which cover plate assembly is carried by the mount of a unit and has a pin depending therefrom, which pin is selectively engageable with one of a plurality of holes formed along the drawbar, the retaining means being in engagement with the take up means whereby, when the take up means is urged in one direction, the pin is urged into and retained in one of said holes.

Other objects of this invention will become apparent from the following specification and accompanying drawing, wherein.

Figure 1:
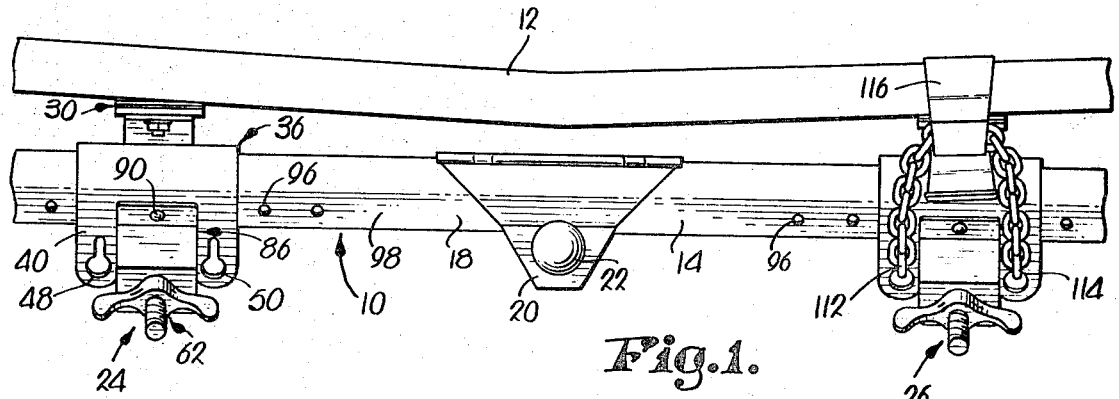
FIG. 1 is a fragmentary, top plan view showing the trailer hitch assembly attached to one type of bumper.

The trailer hitch designated broadly designate by the numeral 10, is intended for use with a towing vehicle 12 having as a part thereof, attachable structure such as a rear bumper 14, and rearwardly extending frame brackets 16 which secure the bumper 14 to the main frame of the towing vehicle 12.

The trailer hitch assembly 10 includes, as its primary components, a drawbar 18, which drawbar has fixedly secured thereto substantially centrally thereof a shelf 20, which shelf 20 carries a ball 22, the ball 22 being adapted to receive the socket of a tongue which is conventionally provided on towed vehicles such as trailers or the like.

Trailer hitch assembly 10 also includes a pair of hitch units 24 and 26, said hitch units being identical in construction and two of such units normally being provided in order to securely attach the drawbar 18 to the towing vehicle 12. Inasmuch as said hitch units 24 and 26 are identical in construction, only one of the same will be described hereinafter, reference being particularly made to FIGS. 2 and 3 of the drawing.

The hitch unit, such as 24 for example, includes a mount 28, which mount is carried by the drawbar 18 and engages the bumper 14 through a bumper-engaging member 30. Mount 28 is attached to the structure of the towing vehicle through first releasable mechanism 32 and second releasable mechanism 34 which will be hereinafter described in greater detail.

Mount 28 is in the nature of an integral component, the same presenting a tubular portion 36 which, in the embodiment chosen for illustration, substantially square in transverse cross-sectional configuration, whereby to present an opening 38 which is slightly larger than the outside dimension of the drawbar 18, which drawbar 18 is likewise square in cross-sectional configuration in the embodiment chosen for illustration, all to the end that mount 28 may be carried by drawbar 18 as by telescoping tubular portion 36 over drawbar 18, it being noted that, when this is done, the unit 24 may be shifted longitudinally of the drawbar 18 whereby to position the same on the drawbar in the desired location with respect to the bumper 14 of the towing vehicle 12. Once the unit 24 is shifted longitudinally of the drawbar 18 to the desired position thereon, the mount is retained with respect to the drawbar by retaining means which will be hereinafter more fully described.

A plate 40 is formed integrally with tubular portion 36 and extends outwardly from the normally uppermost surface of said tubular portion whereby to lie in essentially the same plane as said upper portion and embrace a sleeve 42, which sleeve is formed integrally with the tubular portion 36. Thus, plate 40, in effect, presents a pair of wings 44 and 46, there being a wing on each side of sleeve 42 and each wing having formed therein a keyhole notch 48 and 50 respectively, for purpose which will become apparent.

The sleeve 42 extends in a generally vertical direction although the same is inclined with respect to the horizontal. Sleeve 42 has a front wall 52 which lies in an inclined plane substantially coincident with the rear wall 54 of tubular portion 36, sleeve 42 also having a rear wall 56 with a centrally disposed concavity 58 and suitable sidewalls 60 which are joined to the corresponding wings 44 and 46.

Take up means 62 is carried by the sleeve 42, the take up means 62 including a screw 64 which extends into the upper most end 66 of sleeve 42. A wedge plate portion 68 is secured to threaded screw portion 64 of the take up means 62 and is received within the sleeve 42 extending from the normally lowermost open end 70 thereof. The wedge plate portion 68 is U-shaped in cross-sectional configuration whereby to present a bight 72 and a pair of legs 74, said legs being spaced apart and extending toward the drawbar 18, each of said legs 74 having an inclined edge 76 thereon adjacent the drawbar 18 and particularly the normally rearwardly disposed outer rear face 78 of the drawbar 18. Wedge plate portion 68 is adapted to be coupled with the second releasable mechanism 34 and to this end, includes a keyhole slot 80 formed in the bight thereof, which slot receives one end 82 of the second releasable mechanism 34 which is in the nature of a chain as illustrated.

Takeup means 62 also includes a wing nut 84 threaded upon screw 64 whereby, upon rotation of said wing nut 84, the take up means may be actuated to thereby shift the same longitudinally with respect to the sleeve 42 within which said takeup up means 62 essentially disposed.

In order to retain the unit such as 24 against longitudinal shifting movement upon the drawbar 18 after the unit has been positioned in the desired location on said drawbar 18 there is provided, as a part of mount 28, a retaining assembly 86, which retaining assembly includes a cover plate 88 having a pin 90 depending therefrom said pin 90 passing through an aperture 92 formed in the normally uppermost wall 94 of tubular portion 36 of mount 28 and thence into one of a plurality of holes 96 formed in the upper face 98 of the drawbar 18, it being noted that there are several of such holes 96 adjacent each of the units 24 and 26.

Cover plate assembly 88 has a cover portion 100 overlying the normally uppermost end of sleeve 42, there being an opening 102 in said cover plate 100 whereby threaded portion 64 may pass therethrough, it being noted that the wing nut 84 bears against cover plate 100 through the medium of a suitable washer such as 104. An L-shaped, downward extension 106 joins cover plate 100 with a flange 108, which flange 108 has the pin 90 secured thereto as by welding or the like.

Figure 2:
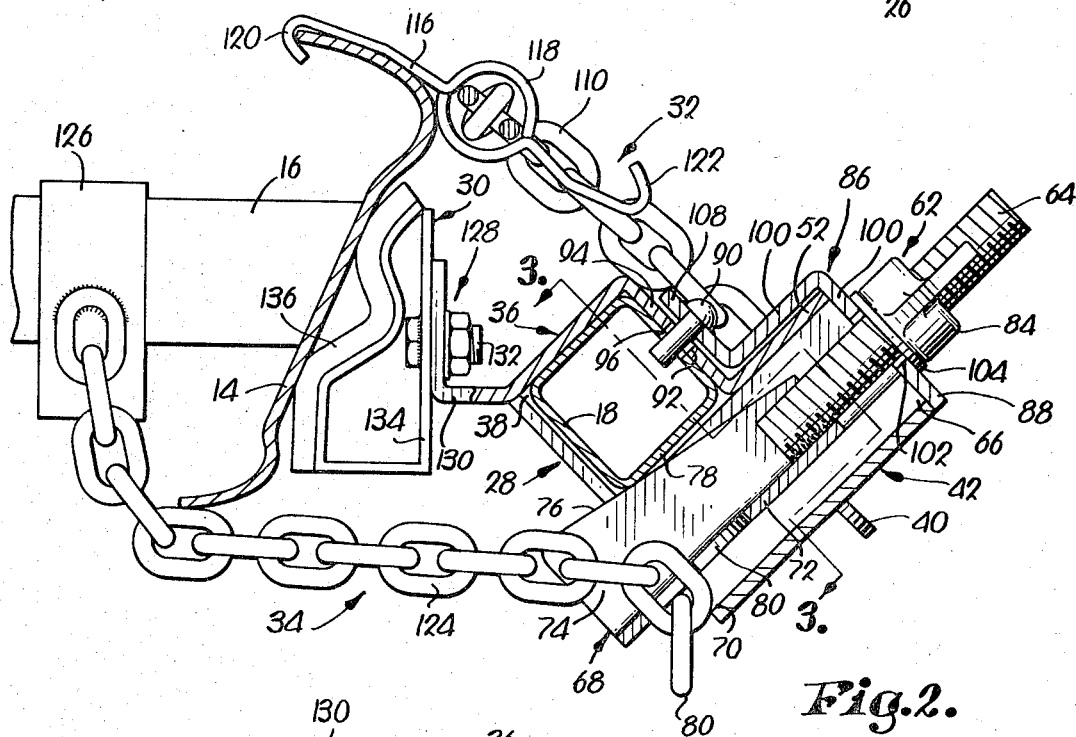
FIG. 2 is a fragmentary, substantially central, vertical cross-sectional view of a hitch unit showing the same mounted on a bumper.
Figure 3:
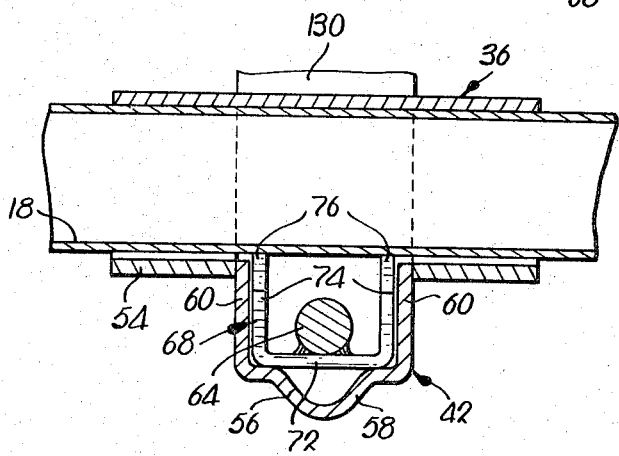
FIG. 3 is a fragmentary, sectional view taken along line 3—3 of FIG. 2.

In order to attach the mount 28 to the towing vehicle 12, there is provided first releasable mechanism, which mechanism is in the form of a length of chain 110, said length of chain having a pair of free ends 112 and 114, there being a latch 116 carried intermediate of said ends 112 and 114, the latch presenting an eye 118 through which the chain 110 is passed, all in the manner shown in FIGS. 1 and 2 of the drawing. Latch 116 includes a pair of hooklike catches 120 and 122 at opposite ends thereof said catches being alternately usable depending upon the configuration of the bumper 14 to which the assembly 10 is to be attached.

Mount 28 is also secured to the towing vehicle 12 by means of second releasable mechanism 34, which mechanism consists of a chain 124 having a hook 126 carried at one end thereof and attachable to the frame 16. The other end 82 of chain 124 is free and is adapted to be engaged within the keyhole slot 80 of wedge plate portion 68 of the takeup means 62, one link of the chain 124 being seated within the slot 80, the links on each side thereof precluding movement of the end 82 of the chain 124 with respect to wedge plat portion 68 once the same has been so engaged It will be noted that he concavity 58 provided on the rear wall of sleeve 42 accommodates the shifting movement of the link of chain 124 which is within slot 80 as the takeup means is actuated, whereby the said wedge plate portion 68 may be shifted upwardly viewing FIG. 2, and into the sleeve 42.

The mount 28 is also provided with bumper-engaging member 30, which member 30 is shiftably secured to the mount 28 by apparatus 128, which apparatus includes a L-shaped arm 130 secured to the tubular portion 36 of mount 28, the same receiving a pivot pin 132 which extends therethrough and also through a backing plate 134.

A cushion 136 is secured to the face of bumper-engaging member 30, said cushion 136 being intended to engage the rear face bumper 14, all as clearly illustrated in FIG. 2 of the drawing so that the metallic surface of the bumper 14 will not become scratched during use of the hitch assembly 10. As is apparent, the member 30 may be rotated about pivot 132 whereby to vary the vertical inclination of the plane presented by the face of cushion 136, all to the end that the hitch unit such as 24 may be accommodate to bumpers of a different configuration or vertical inclination.

When the hitch assembly 10 is to be attached to a towing vehicle 12, the same is initially lifted into a position placing the drawbar 18 and the hitch units 24 and 26 into close proximity to the bumper 14 of the towing vehicle. The latch 116 of each hitch unit is then positioned so that the selected hooklike catch thereof may be placed over the upper free edge of the bumper 14 in the manner illustrated in FIG. 2 of the drawing. The free ends 112 and 114 of the chain of the first releasable mechanism 32 are then locked into their corresponding notches within plate 40 as illustrated in the right-hand portion of FIG. 1 whereby to, in effect, suspend the trailer hitch assembly from the bumper 14. The hitch units 24 and 26 are then shifted longitudinally with respect to the drawbar 18 whereby to position said units at the desired location along said drawbar 18 and at the most advantageous position with respect to the bumper 14, it being that, as said units are shifted, the catch such as 120 will slide along the upper edge of the bumper 14 thereby giving support to the trailer hitch assembly 10 as it is moved into its final position with respect to the bumper 14 of the towing vehicle. The cushion 136 may then be moved into engagement with the bumper thereby giving additional support to the hitch units 24 and 26 at the desired locations.

Once the hitch units 24 and 26 have been so positioned with respect to the bumper 14, the retaining means 86 is shifted downwardly so that the pin 90 thereof will pass through aperture 92 and into one of the selected holes 96 in the drawbar 18, it being noted that such engagement of the pin 90 precludes further shifting movement of the units 24 and 26 respectively with respect to the drawbar 18.

The second releasable mechanism 34 is then utilize to finally and securely attach the unit 24 and 26 to the towing vehicle, this being accomplished by placing the hook 126 over the frame bracket 16 and the end 82 of chain 124 through the keyhole slot 80 in wedge plate portion 68 of the takeup mechanism 62.

The unit is then ready for final tightening, this being accomplished by actuating the takeup means 62 through rotation of the nut 84 upon the threaded portion 64, said actuation causing longitudinal shifting movement of the takeup means 62 with respect to the sleeve 42. More particularly, wedge plate portion 68 is shifted upwardly viewing FIG. 2 whereby the inclined edges 76 are moved into tight wedging engagement with the surface 78 of the drawbar 18, it being noted that as said wedging action is made progressively tighter, the drawbar 18 is constantly more tightly retained between said inclined edges 36 and the walls of tubular portion 36 and, more particularly, the front wall thereof. Thus, as takeup means 62 is actuated, the drawbar is progressively more tightly clamped with respect to the mount 28.

Also, as the takeup means 62 is actuated as by turning nut 84 to move in a downward direction viewing FIG. 2, it will be appreciated that retaining assembly 86 is caused to move in a downward direction, thereby more securely disposing the pin 90 within the aligned aperture 92 and opening 96, such movement automatically occuring as the second releasable mechanism is taken up to securely retain the drawbar with respect to the mount. Thus, the operation of the takeup means 62 not only serves to tighten the second releasable mechanism 34, but also to tightly retain the mount 28 with respect to the drawbar 18 and to even yet further tightly retain the pin 90 within hole 96 whereby to preclude any possibility of longitudinal shifting movement of a unit such as 23 with respect to the drawbar 18.

It will be appreciated that the entire operation of attaching assembly 10 to vehicle 12 is quickly and easily accomplished without the necessity of utilizing any tools or complicated connection means and, additionally, the various adjustable features of the hitch assembly 10 as hereinabove described are such that the assembly can be safely and securely accommodated universally to any known vehicle such as a car, truck or other towing vehicle.

I claim:

1. In a hitch for coupling a towed vehicle to attachable structure on a towing vehicle:
    a drawbar;
    a mount carried by said drawbar and adapted to engage said structure said mount including a sleeve;
    a first releasable mechanism for attaching said mount to said structure;
    a second releasable mechanism for attaching said mount said structure; and
    takeup means for said second releasable mechanism said means being carried by said sleeve and including a threaded portion and a generally triangular wedge plate portion having its smaller end connected to the lower end of said threaded portion said wedge plate portion adapted to be coupled with said second releasable mechanism and presenting at least one inclined edge engageable with said drawbar when said second mechanism is taken up whereby to clamp said drawbar with respect to said mount, said first and second mechanisms cooperating to tightly retain said drawbar with respect to said structure.

2. The invention of claim 1, said wedge plate portion being U-shaped in cross-sectional configuration whereby to present a bight and a pair of legs.

3. The invention of claim 2, said legs extending from said bight toward said drawbar, each of said legs having an inclined edge adjacent said drawbar.

4. The invention of claim 3, said second releasable mechanism being in the form of a chain, one end thereof being coupled with said wedge plate portion, the other end having a hook thereon and said chain.

5. The invention of claim 4, there being a slot formed in bight of said wedge plate portion, said slot receiving said one end of said chain.

6. In a hitch for coupling a towed vehicle to attachable structure on a towing vehicle:

a drawbar, said drawbar having a plurality of spaced-apart holes formed therealong;

a mount carried by said drawbar and adapted to engage said structure, said mount including a sleeve;

a first releasable mechanism for attaching said mount to said structure;

a second releasable mechanism for attaching said mount to said structure;

means for retaining said mount with respect to said drawbar, said means including a cover plate assembly for said sleeve, said assembly having a pin depending therefrom, said pin being selectively engageable with one of said holes in said drawbar; and takeup means for said second releasable mechanism, said takeup means being carried by said sleeve and engageable with said cover plate assembly whereby to retain said pin in said hole when said takeup means is actuated in one direction to takeup said second releasable mechanism.

7. The invention as set forth in claim 6, said takeup including a threaded portion and a nut thereon, said nut being engageable with a portion of said cover plate assembly to urge the same and the pin carried thereby in one direction when the takeup means is actuated to urge said threaded portion in an opposite direction.

8. The invention as set forth in claim 7, said cover assembly overlying one end of said sleeve and having an L-shaped extension in overlying relationship with said drawbar.